United States Patent [19]

Raman et al.

[11] Patent Number: 4,916,622

[45] Date of Patent: Apr. 10, 1990

[54] ATTITUDE CONTROL SYSTEM

[75] Inventors: Kidambi V. Raman, East Windsor; Ludwig Muhlfelder, Livingston; Carl H. Hubert, Cranbury, all of N.J.; Thomas J. Furia, Ambler, Pa.

[73] Assignee: General Electric Company, East Windsor, N.J.

[21] Appl. No.: 207,560

[22] Filed: Jun. 16, 1988

[51] Int. Cl.$^4$ .............................................. B64G 1/32
[52] U.S. Cl. ................................... 364/459; 244/166
[58] Field of Search ................ 364/434, 459; 318/582; 244/164–166, 169–172

[56] References Cited

U.S. PATENT DOCUMENTS

| | | | |
|---|---|---|---|
| 3,643,897 | 2/1972 | Johnson, Jr. | 244/169 |
| 3,695,554 | 10/1972 | Phillips | 244/170 |
| 3,813,067 | 5/1974 | Mork | 244/3.22 |
| 3,830,447 | 8/1974 | Phillips | 244/170 |
| 3,834,653 | 9/1974 | Perkel | 364/434 |
| 3,937,423 | 2/1976 | Johansen | 244/3.22 |
| 3,984,071 | 10/1976 | Fleming | 244/169 |
| 4,062,509 | 12/1977 | Muhlfelder et al. | 244/166 |
| 4,084,773 | 4/1978 | Schmidt, Jr. et al. | 244/166 |
| 4,114,841 | 9/1978 | Muhlfelder et al. | 364/459 |
| 4,230,294 | 10/1980 | Pistiner | 244/170 |
| 4,288,051 | 9/1981 | Göschel | 244/171 |
| 4,370,716 | 1/1983 | Amieux | 364/459 |
| 4,424,948 | 1/1984 | Muhlfelder et al. | 244/166 |
| 4,521,855 | 6/1985 | Lehner et al. | 364/434 |
| 4,728,062 | 3/1988 | Hubert | 244/170 |

FOREIGN PATENT DOCUMENTS 1549544 8/1979 United Kingdom.
2121984 1/1984 United Kingdom.

OTHER PUBLICATIONS

"Magnetotorquing for the Attitude Control of Geostationary Satellites", Proc. of AOCS Conference, Noordwijk, The Netherlands, Oct. 3–6, 1977, ESA SP 128, pp. 103–110, by J. L. Lacombe.

"Optimum Antenna Beam Pointing for Communication Satellites", AIAA 11th Communication Satellite Systems Conf., Mar. 17–20, 1986, San Diego, CA, Article No. AIAA-86-0613-CP, pp. 70–78, by J. E. Keigler et al.

"Three Axis Attitude Control of a Synchronous Communications Satellite", AIAA 3rd Communications Satellite System Conf., Los Angeles, CA, Apr. 6–8, 1970, Paper No. 70-456, pp. 1–7, J. U. Beusch et al.

"Satellite Attitude Control with a Gimbaled Reaction Wheel Digital Control System", Automatica, vol. 8, pp. 9–21, by C. H. Much et al.

"Satellite Earth-Pointing Attitude Control in the Absence of Yaw Sensing, Using a Double-Gimballed Momentum Wheel", J. British Interplanetary Society, vol. 27, pp. 443–458, 1974, by W. G. Hughes.

"High Pointing Accuracy with a Momentum Bias Attitude Control System", J. Guidance and Control, vol. 3, No. 3, May–Jun. 1980, Article No. 78-569R, pp. 195–202, by K. L. Lebsock.

"The Application of Magnetic Attitude Control to a Momentum-Biased, Synchronous Communications Satellite", AIAA Guidance and Control Conf., Boston, MA, Aug. 20–22, 1975, by G. E. Schmidt, Jr.

Primary Examiner—Gary Chin
Attorney, Agent, or Firm—Clement A. Berard, Jr.

[57] ABSTRACT

An attitude control system using magnetic torquing is enhanced using a momentum wheel which is pivoted if the sensed error signal about the roll axis exceeds a given threshold. The momentum wheel is pivoted under control of a stepping motor through a first angle proportional to the detected average roll error, and one-half nutation period later through an equal angle in the same direction. Alternatively, the momentum wheel is pivoted over first and second angles of different values wherein the difference is related to nutation.

21 Claims, 7 Drawing Sheets

*Fig. 9*

ATTITUDE CONTROL SYSTEM

This invention relates to an attitude control system and, more particularly, to an attitude control system employing a pivoted momentum wheel, and which may be used to enhance a magnetic attitude control system.

Magnetic torquing systems are used to control the attitude of momentum biased satellites, including commercial communication satellites. U.S. Pat. Nos. 3,834,653 of Perkel and 4,062,509 of Muhlfelder et al. are examples of such closed loop attitude control systems. The torquing means consists of a magnetic dipole which, when energized by closed loop control action, interacts with the environmental magnetic field existing about the earth or another planet and exerts a precession torque to correct the satellite's attitude.

A magnetic control torque in this operation must be large enough to overcome all environmental disturbance torques (such as those induced by solar radiation pressure, gravity gradient, magnetic interactions, radio frequency pressure, and the like) which cause the satellite to deviate from its desired orientation or desired attitude. These disturbance torques can be constant (bias), or cyclic (orbital, diurnal, or seasonal), or a mixture of constant and cyclic components. The magnetic control torque, therefore, must be sufficient for the maximum (i.e., worst case) combination of these effects. In addition, the torquer must produce sufficient control torque in the presence of normal diurnal variations of the environmental magnetic field and a diminished environmental magnetic field (as can occur during solar storms). In some extreme and very infrequent cases, solar storms can completely reverse the environmental magnetic field. Alternative control means (or backup means) must be provided to preclude attitude divergence in this latter instance.

It is further desirable to provide some means that, in addition to controlling attitude, also damps nutation. Nutation damping using magnetic torquers is described in a patent granted to Muhlfelder et al. (U.S. Pat. No. 4,424,948).

SUMMARY OF THE INVENTION

In accordance with one embodiment of the present invention, an attitude control system is provided that comprises a means for generating an error signal representing an angular deviation about an axis that is transverse to the pitch axis (for example, the roll axis); means for rotating a momentum vector in a predetermined direction to correct the sensed error (for example, by pivoting a momentum wheel); magnetic torquing means comprising a commandable magnetic dipole along a selected axis, and means responsive to the error signal to energize the magnetic torquing means to reduce the attitude error. Further, magnetic torquing operation may await the sensed error signal exceeding a given threshold. In another aspect, the control system may also include a second threshold having a value greater than the given threshold and at which the means for rotating the momentum vector is operated.

DETAILED DESCRIPTION OF THE PREFERRED EMBODIMENT

Figure 1:
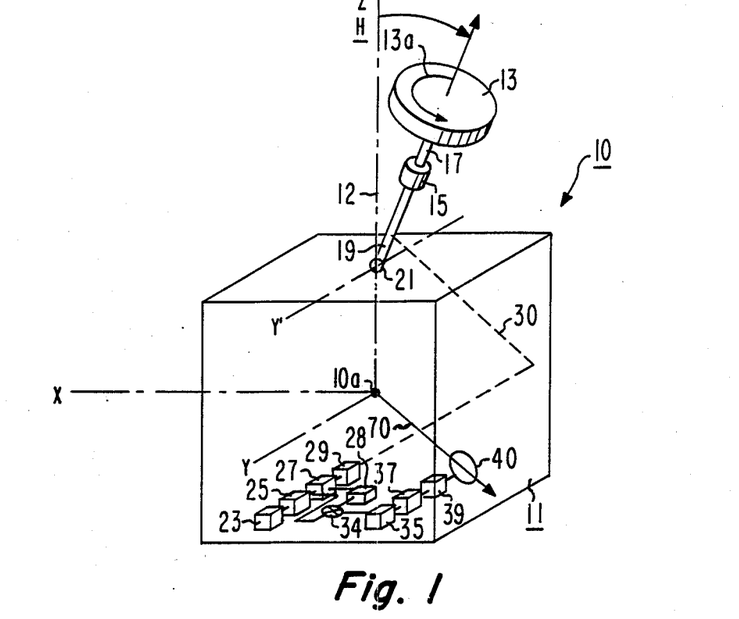
FIG. 1 is a diagram illustrating a spacecraft having an embodiment of the present invention.

FIG. 1 illustrates spacecraft 10 having reference axes X, Y, and Z. These axes form an orthogonal right-handed coordinate system fixed in the spacecraft's body and centered at the center of mass 10a. The Z axis is nominally parallel to the spacecraft's total angular momentum vector H when the spacecraft is in its intended attitude. A momentum wheel or rotor 13 is aligned so that its angular momentum vector is nominally parallel to the Z axis. A motor 15 couples the stabilized platform or body 11, which may contain an antenna or other payload, and the spinning momentum wheel 13. The rotational speed of motor 15 is controlled so that the momentum stored by wheel 13 is sufficient to provide gyroscopic stiffness to the satellite 10. The motor speed is also controlled to maintain the body or platform 11 so that the antenna on one face is pointing in the desired direction (for example, towards earth). This control action nominally maintains the X-axis in the plane defined by the local vertical and the orbit normal. As such, in a geosynchronous orbit, the platform 11 rotates once per day. This control is provided by a pitch control system, as described, for example, in U.S. Pat. Nos. 3,695,554 and 3,830,447 of Kevin Phillips, incorporated herein by reference.

The momentum wheel 13, which is nominally aligned with its angular momentum vector parallel to the Z axis, is pivoted by a hinge mechanism parallel to the Y axis. This pivot allows the wheel's angular momentum vector to be moved within the plane defined by the X and Z axes. The wheel 13 is mounted on rotor 17 of motor 15. The stator of motor 15 is mounted to member 19 which is attached to platform 11 via a hinge 21. Hinge 21 lies on and pivots about the Y' axis, which is parallel to the Y axis.

Note that pivoting wheel 13 does not change the total momentum of spacecraft 10, but moves the wheel's angular momentum vector with respect to spacecraft 10 thereby transferring momentum between axes. Magnetic torquing, on the other hand, produces a net change (a secular change) in the total momentum of spacecraft 10 and thus may "unload" excess momentum as well as correct attitude errors.

A sensor 23 senses angular motion about an axis parallel to the Y axis. The sensor may, for example, be a typical horizon sensor that is sensitive to the infrared characteristics of the planet's horizon and produces a signal that is proportional to the satellite's roll attitude error, or it may be another type of earth sensor. A more detailed description of a horizon sensor can be had by reviewing U.S. Pat. No. 4,062,509 of Muhlfelder, incorporated herein by reference.

Figure 2:
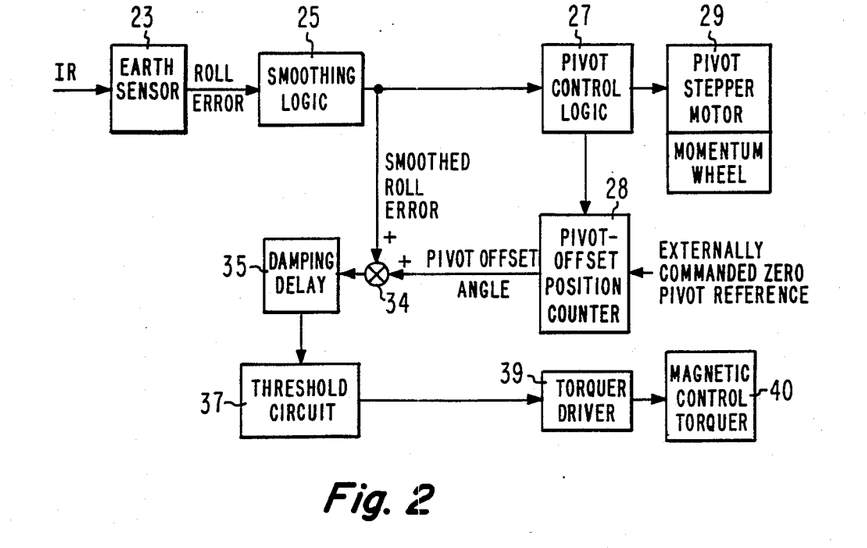
FIG. 2 is a block diagram of the embodiment of FIG. 1.

The roll attitude error detected by the sensor 23 passes through a smoothing logic 25 (FIG. 2). In FIGS. 1 and 2, the same numbers denote the same devices. The output from the smoothing logic 25 passes to pivot control logic 27 and also to summing circuit 34. The output from the summing circuit 34 is delayed by circuit 35. The delayed output of circuit 35 passes through threshold circuit 37 that operates the roll torquer driver 39 for energizing the magnetic torquing coil 40 in accordance with prior-art-magnetic-torquing as discussed in the above-cited U.S. Pat. No. 3,834,653. The torquing coil may have a skewed dipole (e.g., as represented by the arrow 70) as discussed in U.S. Pat. No. 4,062,509 of Muhlfelder et al. Circuit 35 delays the magnetic torquing for a fraction of the nutation period. This delay shifts the phase of the torque to decrease the nutation, as described in U.S. Pat. No. 4,424,948 of Muhlfelder et al., incorporated by reference herein. Coil 40 applies a correcting torque via interaction with the ambient magnetic field. This magnetic control system, consisting of the earth sensor assembly, the smoothing logic, the damping delay, the threshold circuit, torque driver and magnetic torquer, is described in the above-cited U.S. Pat. No. 4,424,948.

To counteract all the previously discussed disturbances, a magnetic torquer must be sized to accommodate the worst-case condition, i.e. the sum of the maximums of each disturbance torque in conjunction with the minimum environmental magnetic field. This requires a large magnetic coil that provides a large magnetic dipole, and so will be heavy and will consume substantial electrical power, all of which are undesirable.

In accordance with the teachings herein, a much smaller torquer will suffice if the magnetic torquer is used for fine resolution control and a pivoted momentum wheel is used to temporarily store angular momentum accumulated in the X-Z plane, thereby preventing large attitude excursions.

The need for this supplementary correction can be detected and acted on by the pivot control logic 27. Pivot control logic 27 may include a threshold circuit having a threshold that is greater than that of threshold circuit 37, whereby wheel pivoting will serve only to limit the attitude control error.

The pivot control logic 27 includes a microprocessor that determines when control is needed and then generates control signals. These signals are commands to a stepper motor 29 that mechanically links (represented by dashed lines 30 in FIG. 1) the satellite body 11 and the pivotable member 19 on which motor 15 and wheel 13 are mounted. The stepper motor 29 rotates the spin axis of the momentum wheel 13 relative to the Z axis 12 of the platform 11 in steps about the Y' axis. If the roll error is positive (that is, if the spacecraft is displaced from its nominal orientation by a rotation about the positive Y axis), then the motor pivots the wheel in a positive sense about the Y' axis. If, however, the roll error is negative, the wheel is pivoted in a negative sense about the Y' axis. The pivot control logic 27 generates pivot commands in pairs, the individual commands in these pairs being nominally one-half nutation period apart. Each of these commands may include a plurality of steps, but the duration of each command is typically only a small portion of the spacecraft nutation period.

In one embodiment of the present invention, the pivot control logic 27 commands equal pivot angles for each half of a pair. For example, to correct a roll error, the microprocessor within logic 27 would command half of the required steps in the direction to reduce the error, and one-half nutation period later would command the remaining steps in the same direction. By commanding equal pivot angles with a one-half nutation period separation, the control logic 27 tends to prevent the roll control action from increasing the spacecraft's nutation.

In another embodiment of the present invention, the pivot control logic 27 commands pairs of nominally unequal pivot angles whereby the pivot action damps nutation while correcting roll errors. The logic for both embodiments will be described below.

Representing the first angular step by $\theta_1$ and the second by $\theta_2$, each pair of steps changes the orientation of the momentum wheel axis about the satellite roll axis by $\theta_1 + \theta_2$. This, in turn, changes the roll orientation of the satellite by $\theta_1 + \theta_2$ in the appropriate direction to reduce the roll error sensed by the earth sensor 23. The pivot control logic 27, in addition to providing stepping pulses to the momentum wheel pivot stepper motor 29, also provides a related signal to a counter 28. This counter 28 determines the net pivot offset angle. This angle from counter 28 is then added to the smoothed roll error signal from logic 25 at summing circuit 34. The pivot offset angle is only that due to the closed loop action described above; any externally commanded pivot offset is used by the logic within counter 28 as a zero reference for calculating the pivot-offset position in the implementation described herein.

For a spacecraft as depicted in FIG. 1, a roll error represents an angular misalignment about the roll axis Y between the pitch axis Z and the orbit normal. If the axis of wheel 13 is initially aligned with the pitch axis Z, then the wheel's angular momentum vector would also be offset from the orbit normal In the operation of the system, when the sensor detects a roll error that exceeds a threshold within the pivot control logic 27, correction is applied in two steps as will be described below. When the two steps are completed, the roll error will be corrected and the pitch axis will be aligned with the orbit normal. The second step will return the wheel axis to its original orientation in inertial space, but it is now offset from the satellite's pitch axis. The counter 28 records this angular displacement, and the net displacement is added to the roll error for use by the magnetic control loop.

As a result, the magnetic control loop acts to align the wheel's axis (and its angular momentum vector) with the orbit normal. The combined action of the pivot logic 27 and the magnetic control loop tends to align both the pitch axis and the wheel's spin axis with the orbit normal.

The signal from summing circuit 34, representing the sum of the smoothed roll error and the pivot-offset angle, is delayed via delay 35 and is thresholded via circuit 37, as discussed previously, and as discussed in connection with U.S. Pat. No. 4,424,948. The delayed signal permits precession of the total satellite momentum vector while simultaneously damping any prevailing nutation. The thresholded signal generated by circuit 37 is applied with appropriate polarity to the magnetic torquer 40 via the torquer driver (39).

The control method described above retains the advantages of magnetic attitude control (fine resolution, no mass expulsion required, high reliability, simultaneous precession control and nutation damping) while reducing the size, weight and power of the required magnetic torquer by supplementing the magnetic closed loop control with an actively pivoted momentum wheel. The pivoted momentum wheel temporarily stores momentum in the transverse (roll/yaw) plane, thus precluding unacceptable attitude excursions due to temporary magnetic control torque saturation. In some satellites, this approach can halve the size and weight of the magnetic torquer. Furthermore, if the environmental magnetic field temporarily weakens or reverses, the pivot action will automatically prevent attitude divergence.

Figure 3:
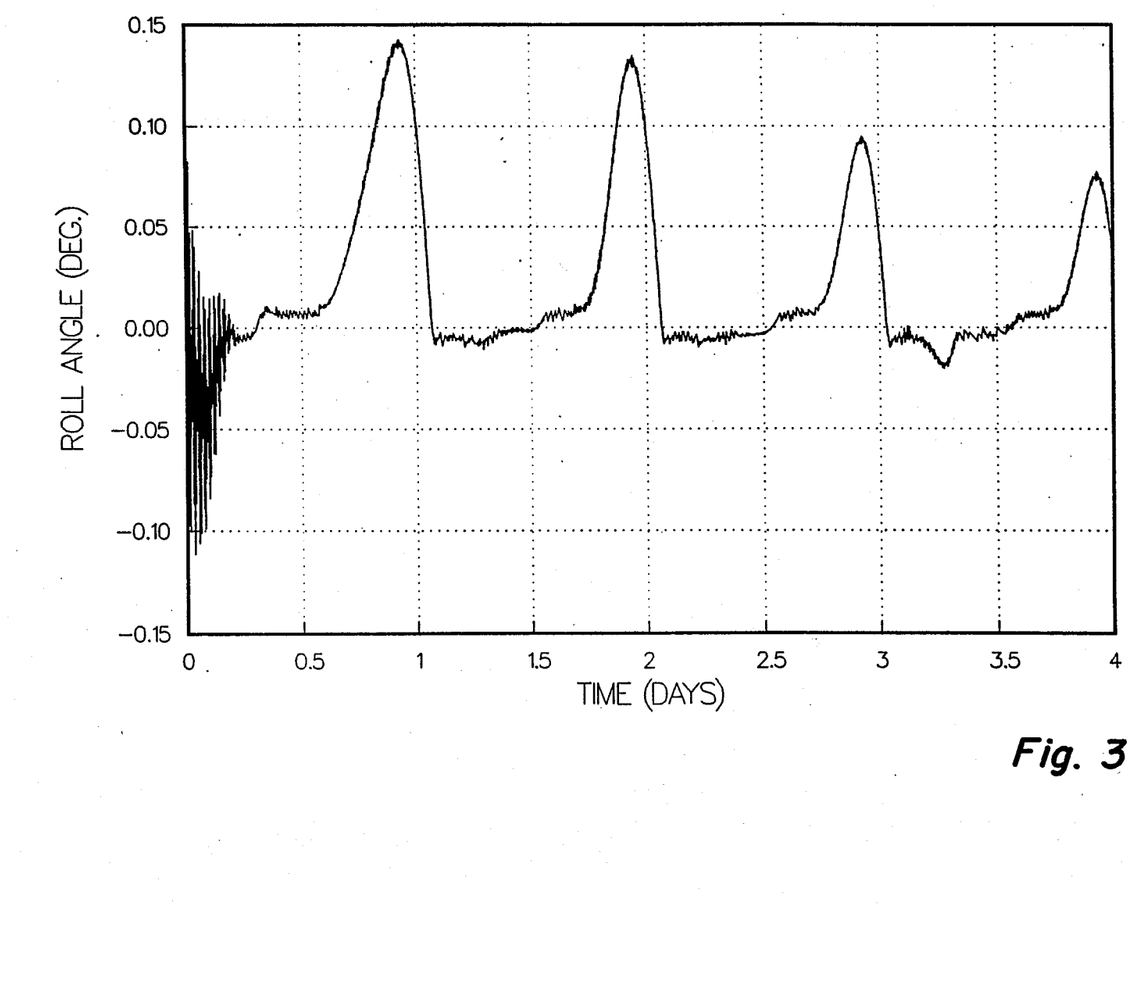
FIG. 3 is a plot of roll error history of a typical communication satellite using an under-sized roll control magnetic torquer.
Figure 4:
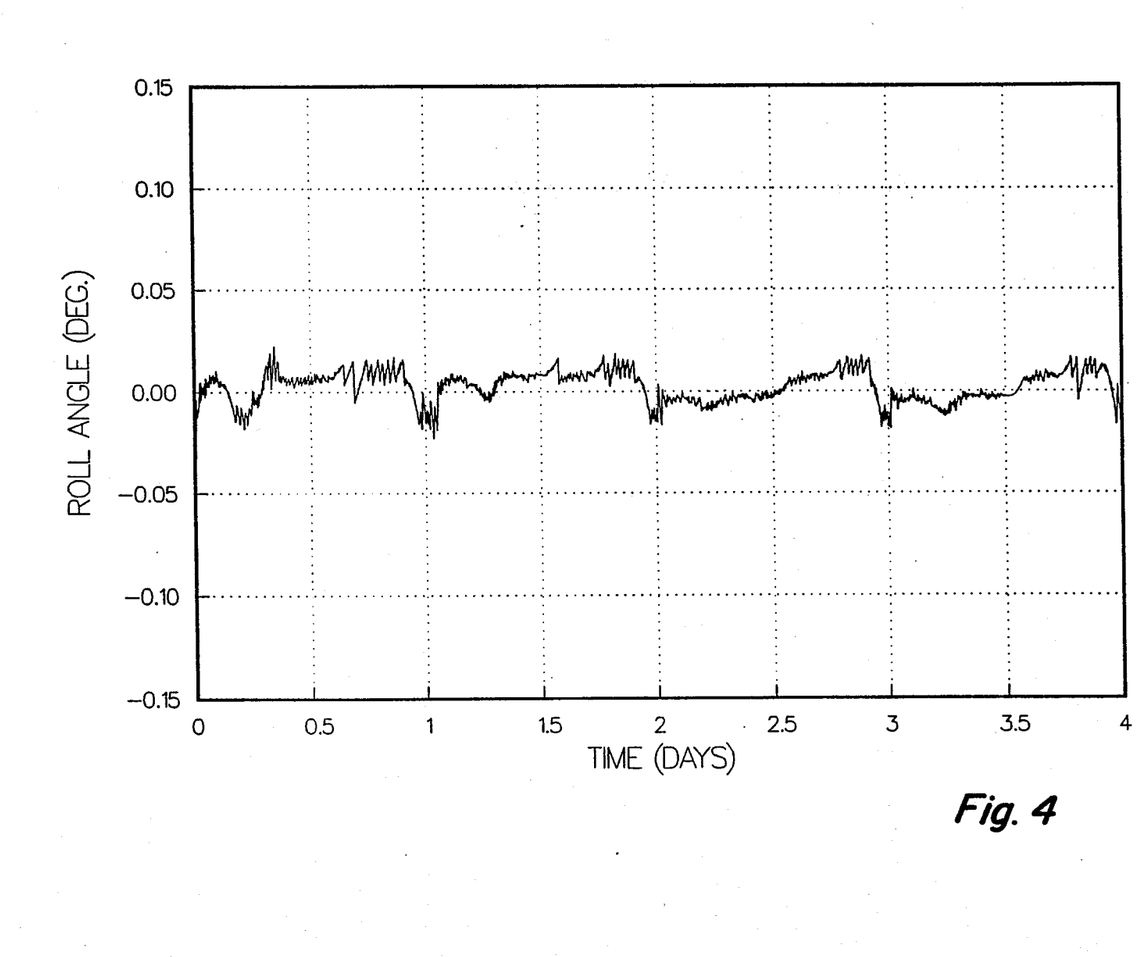
FIG. 4 is a plot of the roll error history of the same satellite and same undersized magnetic torquer as in FIG. 3 with the pivoted momentum wheel according to the present invention.
Figure 5:
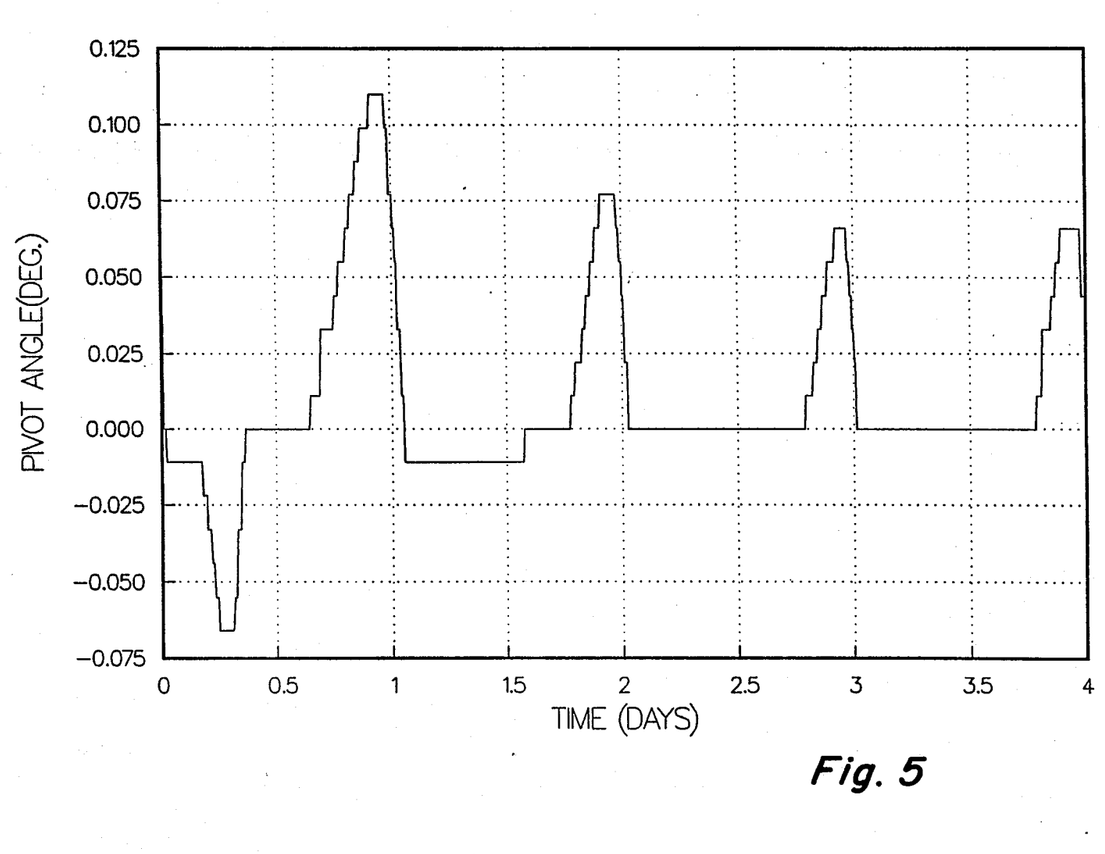
FIG. 5 is a plot of the pivot angle of the momentum wheel to achieve the reduced roll error history of FIG. 4.

Computer simulation results demonstrating the benefits of this unique implementation are shown in FIGS. 3, 4, and 5. FIG. 3 shows the roll attitude history of a typical geosynchronous momentum-biased satellite that uses an "under-sized" roll control torquer alone. With the pivoted wheel of the present invention, the large roll attitude excursions of FIG. 3 (caused by temporary torque saturation) are substantially reduced, as shown in FIG. 4. This is accomplished as a result of the closed loop pivot action illustrated in FIG. 5. In these simulations, the resolution per pair of pivot steps $(\theta_1 + \theta_2)$ is 0.009°, the threshold for pivot actuation is 0.02°, and the threshold for magnetic torquing is 0.01°. The implementation described above illustrates the advantages of this control design.

Operation of one embodiment of the pivot control logic 27 will now be described in connection with FIG. 6. The roll angle $\phi$ is monitored until a threshold $\tau$ is crossed. When the roll angle $\phi$ equals or exceeds the selected threshold $\tau$, the roll angle $\phi$ is recorded, i.e. stored. Nominally one-half nutation period later (known a priori), the roll angle $\phi$ is again recorded. (Note that the precession error is the average of these two readings--averaging or summing these two readings removes the nutation component of the roll angle from the value used to initiate corrections.) The logic 27 then commands the stepper motor 29 to pivot wheel 13 through a first angle proportional to the sum of these two readings. After another one-half nutation period delay, the logic 27 commands the stepper motor 29 to pivot wheel 13 through an angle equal to the first pivot angle. After a short delay to allow any transients introduced by stepper motor 29 pivoting wheel 13 to settle out, the logic 27 resumes monitoring the roll angle $\phi$. As mentioned previously, commanding two equal pivot angle changes separated by one-half the nutation period prevents the roll control action from increasing the spacecraft's nutation.

Figure 6:
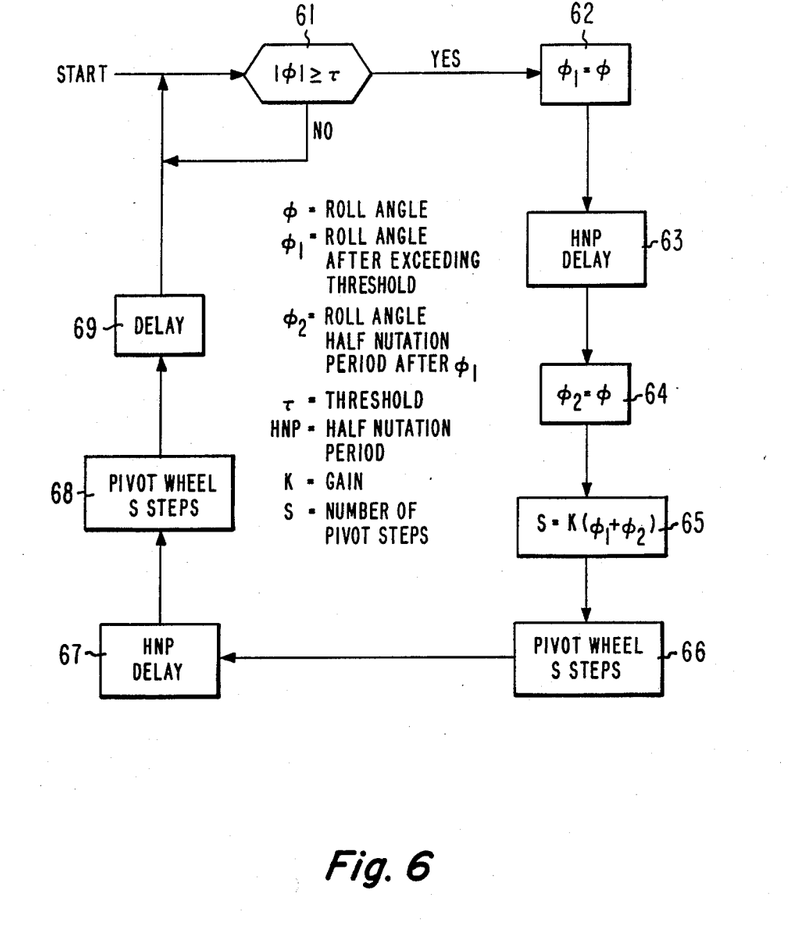
FIG. 6 is a flowchart of the pivot control logic in accordance with one embodiment of the present invention.

FIG. 6 is a flowchart representing a program for the microprocessor within logic 27 for the embodiment just described. The microprocessor first determines (block 61) whether the absolute value of the roll error signal $\phi$ equals or exceeds the threshold $\tau$ for the pivot control system. If the decision is "no," no change in the pivot angle is needed and operation of the remainder of control logic 27 is bypassed. Block 61 is repeatedly executed until the decision is "yes." Once the roll angle $\phi$ exceeds threshold $\tau$, the roll error $\phi_1$ is recorded (block 62). Following a one-half nutation period (HNP) delay (block 63), the roll error $\phi_2$ is recorded again (block 64). The microprocessor then calculates (block 65) the number S of pivot steps needed to correct the precession error. The number of pivot steps (S) is proportional to the sum of the two recorded roll errors $(\phi_1 + \phi_2)$ and may be either positive or negative, depending on the sign of the roll error. A positive value of S indicates that the wheel should pivot about the positive Y' axis (see FIG. 1), and a negative value of S indicates that it should pivot in the opposite direction. The microprocessor commands stepper motor 29 to move and to pivot wheel 13 by S steps (block 66). Following another one-half nutation period delay (block 67), the microprocessor commands the stepper motor 29 to pivot wheel 13 by S additional steps (block 68). After another a short delay (block 69), the process is repeated.

Operation of a preferred embodiment of the pivot control logic 27 will now be described in connection with the control logic flowchart of FIG. 7. Roll angle $\phi$ is monitored until a threshold $\tau$ is exceeded, whereupon the roll angle is recorded The system then determines the peak roll error during the next one-quarter of a nutation cycle, if that peak error has the same sign as that recorded at the threshold. At the peak the roll angle $\phi$ is recorded and the nutation cycle timer resets to zero However, if the roll angle $\phi$ equals zero or changes sign at any time during the one-quarter cycle, the control system resets and the monitoring process begins anew.

When the timer indicates that one-half nutation period has passed since the recorded peak, the roll angle is sampled again. The precession error is the average of the two readings taken one-half nutation period apart. The nutation error equals one-half the difference between these two readings. Note that it may not be necessary to perform the division operations described in the preceding two sentences because precession error is proportional to the sum of the to readings and nutation error is proportional to their difference. The system uses the two readings to calculate the number of pivot steps $S_P$ required to pivot wheel 13 so as to correct the precession error, and the number of pivot steps $S_N$ required to correct the nutation error. To compensate for the entire error within one control cycle, each of the two control pivot angles should be made to equal one-half the precession and nutation errors. Once the pivot angles have been calculated, the stepper motor 29 pivots wheel 13 through an angle proportional to the sum of the precession and nutation pivot angles $(S_P + S_N)$. One-half a nutation period later, the wheel is pivoted again—this time through an angle proportional to the difference between the precession and nutation pivot angles $(S_P - S_N)$. Following a delay to allow disturbances from the pivoting to settle out, the procedure is repeated.

A full control cycle takes between 1 and 1½ nutation periods to complete. Ideally, both large and small errors can be corrected within a single control cycle. However, gain errors, pivot angle limits, timing errors, sensor noise and other practical limitations can increase the time needed in practice to correct large errors to several nutation cycles. This is still a much faster response than is possible with the magnetic torquer yaw/roll control system. The pivot resolution, however, is limited by the step size of stepper motor 29. Although the magnetic control system is much slower, its lower threshold and lower corrective torque generally provide finer control and more complete nutation damping. On the other hand, the pivot control system provides a supplemental action that rapidly corrects large errors by temporarily storing transverse momentum in a pivoted wheel 13.

Figure 7:
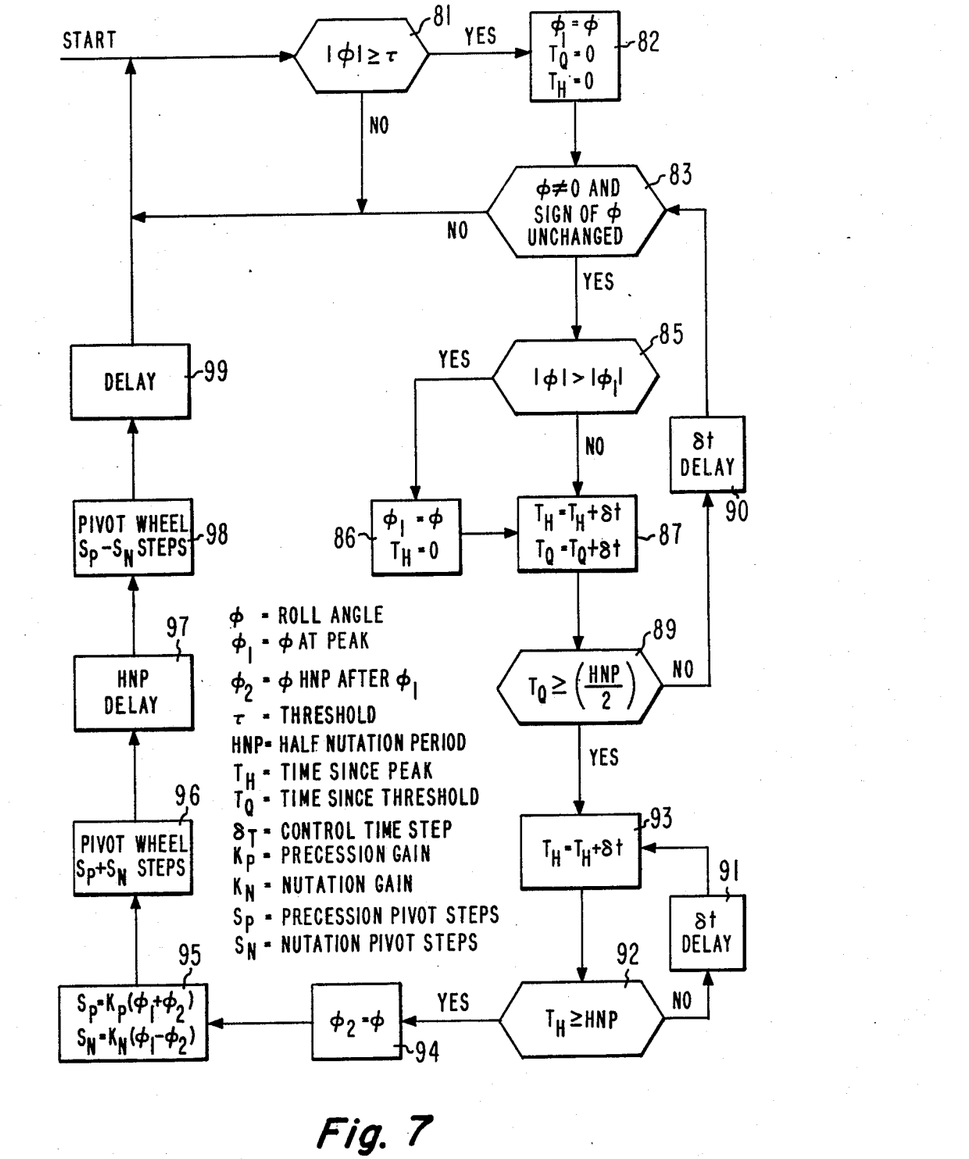
FIG. 7 is a flowchart of the pivot control logic in accordance with another embodiment of the present invention wherein the pivoted wheel enhancement also provides nutation damping.

The flowchart of FIG. 7 represents a microprocessor program for the combined precession and nutation control whose operation was just described. The microprocessor first determines (block 81) whether the absolute value of the roll angle error signal $\phi$ exceeds the threshold $\tau$ for the pivot control system. If the decision is "no," the remainder of control logic 27 is bypassed and the system waits and monitors subsequent error signals. If the decision is "yes," as represented by the arrow at the right of block 81, the roll error $\phi$ is recorded and two timers are reset to zero (block 82). If the roll angle error $\phi$ equals zero, or changes sign at any time during the next one-quarter of a nutation period (block 83), the control system is reset as represented by the "no" output from block 83 and the process begins anew. If the roll angle $\phi$ does not equal zero, and the sign does not change ("yes" arrow from block 83), the decision logic (block 85) determines if the current roll angle $\phi$ exceeds the previous peak roll angle $\phi_1$. If the new roll angle $\phi$ exceeds the previously stored peak roll angle $\phi_1$ the new peak roll angle is stored and the one-half nutation period timer $T_H$ is reset (block 86).

Block 87 measures the time $T_Q$ since crossing the threshold and the time $T_H$ since reaching the peak (block 87). When one-quarter of a nutation period has passed since the threshold was crossed, as represented by the arrow labelled "yes" leading from block 89, the system stops monitoring the roll angle. If not, as represented by the "no" arrow from block 89, then the roll angle error continues to be monitored by block 83 via a delay (block 90). When the time $T_H$ since the recorded peak equals or exceeds one-half nutation period, as represented by the arrow labelled "yes" leading from block 92, the roll error angle $\phi_2$ is sampled and stored (block 94). If not ("no" arrow from block 92), the time is updated (blocks 91, 93). The number of precession pivoting steps ($S_P$) is then calculated in proportion to the sum of the peak roll angle $\phi_1$ and the roll angle $\phi_2$ one-half nutation cycle after reaching the peak (block 95). The number of nutation pivoting steps $S_N$ is calculated in proportion to the difference between the two roll angles ($\phi_1 - \phi_2$) (block 95). The stepper motor 29 is then stepped by the sum of the precession and nutation pivot steps, (block 96) to pivot wheel 13 by $S_P + S_N$ steps. After a one-half nutation period delay (block 97), the stepper motor 29 is stepped by the difference between the precession pivot steps $S_P$ and the nutation pivot steps $S_N$ (block 98) to pivot wheel 13 by $S_P - S_N$ steps. Following a delay 99 the procedure is repeated.

It is recognized that the pivot control logic 27 represented by the flow charts of FIGS. 6 and 7 could also be used without the magnetic control subsystem, i.e., by using only blocks 23, 25, 27 and 29 of FIG. 2.

Figure 8:
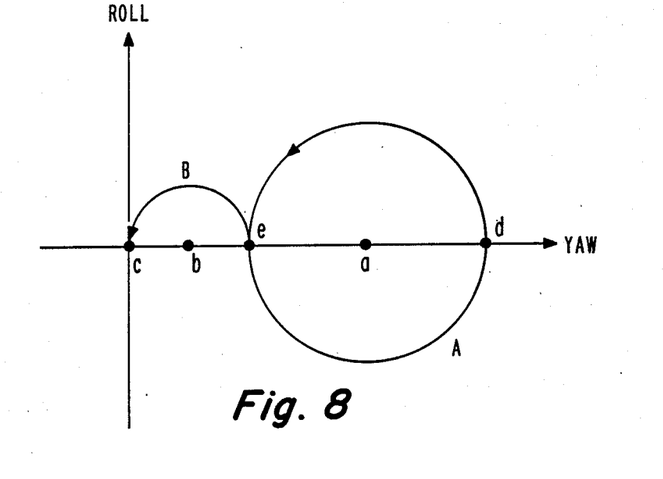
FIGS. 8 and 9 illustrate the trajectory of the spacecraft's body-fixed pitch axis projected on the inertially-fixed yaw/roll plane when performing corrections where the initial precession error exceeds the nutation error, and where the nutation error exceeds the precession error, respectively.
Figure 9:
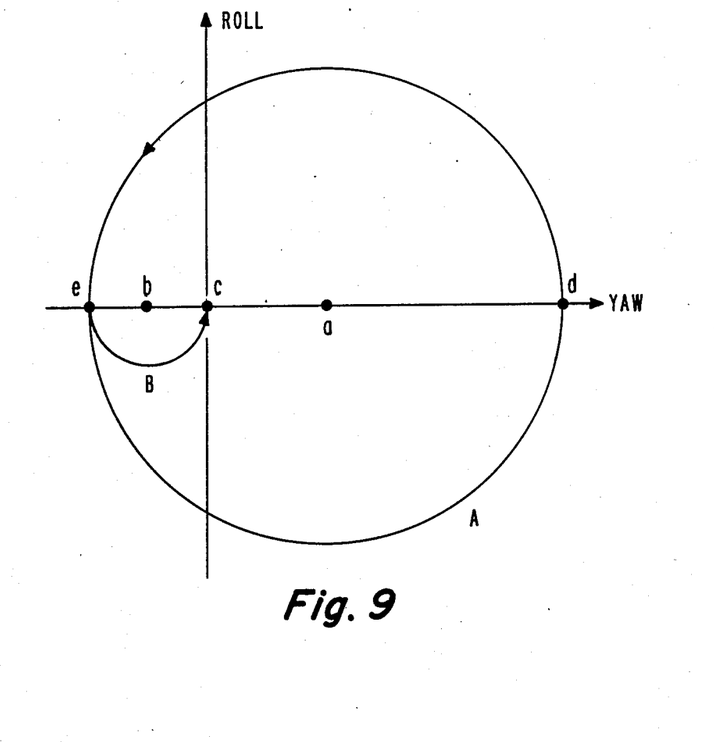

The spacecraft dynamics associated with the pivoting of wheel 13 as commanded by the embodiment of FIG. 7 are illustrated in FIGS. 8 and 9. These diagrams show the trajectory of the tip of the spacecraft's body-fixed pitch axis projected on the inertially-fixed yaw/roll plane. For simplicity, it is assumed that the spacecraft is inertially symmetric about the pitch-axis. The nominal trajectory (no precession error and no nutation) is simply equilibrium point c. With a pure roll precession error, the trajectory is equilibrium point a. With a precession error plus nutation, the trajectory is a circular path, A, centered on a. For a dynamically stable spacecraft, this nutational motion will be prograde (counterclockwise). The projected pitch axis travels completely around this circular path A once every nutation cycle.

FIGS. 8 and 9 represent the results of perfect pivot control. Although the actual performance will be similar to that depicted in FIGS. 8 and 9, in practice there will be some residual error that must be removed in one or more subsequent control cycles. For FIG. 8, the initial precession error exceeds the nutation error. For FIG. 9, this relationship is reversed.

In both FIGS., the roll error is greatest when the projected pitch axis is at point d on trajectory A. This is the peak error detected by the preferred pivot control logic 27 (FIG. 7). The pivot control action takes place half a nutation cycle later, when the projected pitch axis is at point e at which the first pivoting of wheel 13 occurs. This first pivoting reduces both the nutation and precession errors. Thereafter, the trajectory is circular path B, centered on point b. One-half a nutation cycle after the first pivoting, the projected pitch axis is at point c. At this point, the spacecraft's body-fixed pitch axis is parallel to the inertial pitch axis. This is the target attitude, and the second pivoting of wheel 13 occurs at this point. The second pivoting reduces both the nutation and precession errors essentially to zero and the final trajectory is point c.

What is claimed is:

1. An attitude control system for a spacecraft having a momentum bias comprising:
   a momentum wheel spinning about an axis substantially parallel to a first axis of said spacecraft to produce angular momentum for providing said momentum bias;
   means for rotating the angular momentum of said momentum wheel with respect to said spacecraft;
   means for providing an attitude error signal responsive to angular deviation of the spacecraft about one or more axes perpendicular to the first axis;
   magnetic torquing means for providing, when energized, magnetic dipoles for developing torque about one or more selected axes;
   first control means responsive to said attitude error signal exceeding a first threshold for energizing said magnetic torquing means for developing correcting torque for reducing said deviation; and
   second control means coupled to said means for rotating and responsive to said attitude error signal exceeding a second threshold greater than said first threshold, said second control means for causing the angular momentum of said momentum wheel to rotate in a direction to reduce said deviation.

2. The combination of claim 1 wherein said means for rotating comprises means for pivotally mounting said momentum wheel on said spacecraft.

3. The combination of claim 2 wherein said means for pivotally mounting includes control logic means for generating pivot signals, and means responsive to said pivot signals for pivoting said momentum wheel.

4. The combination of claim 3 wherein said means responsive to said pivot signals is a stepper motor.

5. The combination of claim 3 wherein said pivot signals are generated in pairs separated in time by about one-half the spacecraft nutation period.

6. The combination of claim 5 wherein said pairs of pivot signals comprise two signals of substantially equal value.

7. The combination of claim 1 wherein said first axis is the pitch axis and said attitude error signal represents deviation about the roll axis.

8. The combination of claim 1 wherein said attitude error signal includes a nutation component, and wherein said second control means generates pivot signals for rotating the angular momentum substantially independently of said nutation component.

9. The combination of claim 8 wherein said second control means generates said pivot signals in pairs of substantially equal value.

10. The combination of claim 1 wherein said attitude error signal includes a nutation component, and wherein said second control means generates pivot signals for rotating the angular momentum responsive to said attitude error signal including said nutation component.

11. The combination of claim 10 wherein said second control means generates said pivot signals in pairs of unequal value, said unequal value being responsive to the nutation component of said attitude error signal.

12. The combination of claim 1 wherein said first threshold is zero.

13. An attitude control system for a spacecraft comprising:
    a spinning body pivotally mounted to a platform body wherein the axis of the pivotal mounting is orthogonal to the nominal angular momentum axis of the spacecraft;
    means responsive to motion of the platform body in inertial space about an axis transverse to the nominal angular momentum axis, for providing a first signal representing a first error angle $\phi_1$ about said transverse axis at a first time, and for providing a second signal representing a second error angle $\phi_2$ about said same transverse axis at a second time one-half spacecraft nutation period later than said first time; and
    drive means coupled between said spinning body and said platform body and responsive to said first and second signals for pivoting the spinning body over a first pivot angle proportional to $(\phi_1+\phi_2)$ and one-half nutation period later pivoting the spinning body over a second pivot angle also proportional to $(\phi_1+\phi_2)$.

14. The system of claim 13 wherein said first and second pivot angles are substantially equal.

15. The system of claim 13 wherein said drive means includes a stepper motor and means for driving said stepper motor, wherein said drive means drives said stepper motor a number of steps proportional to $(\phi_1+\phi_2)$.

16. The system of claim 13 wherein said means responsive to motion provides said first signal responsive to said first error angle $\phi_1$ exceeding a threshold value.

17. An attitude control and nutation damping system for a spacecraft comprising:
    a spinning body pivotally mounted to a platform body wherein the axis of the pivotal mounting is orthogonal to the nominal angular momentum axis of the spacecraft;
    means responsive to motion of the platform body in inertial space about an axis transverse to the nominal angular momentum axis, for providing a first signal representing a first error angle $\phi_1$ about said transverse axis at a first time, and for providing a second signal representing a second error angle $\phi_2$ about said same transverse axis at a second time one-half spacecraft nutation period later than said first time; and
    drive means coupled between said spinning body and said platform body and responsive to said first and second signals for generating first and second control signals proportional to $(\phi_1+\phi_2)$ and $(\phi_1-\phi_2)$, respectively, for pivoting the spinning body over a first pivot angle proportional to the sum of said first and second control signals, and one-half nutation period later pivoting the spinning body over a second pivot angle proportional to the difference of said first and second control signals.

18. The system of claim 17 wherein said drive means includes a stepper motor and means for driving said stepper motor by numbers of steps related to said sum and to said difference of said first and second control signals.

19. The system of claim 17 wherein said means responsive to motion provides said first signal responsive to said first error angle $\phi_1$ exceeding a threshold value.

20. The system of claim 17 wherein said means responsive to motion provides said first signal responsive to a peak value of said first error angle $\phi_1$.

21. The system of claim 20 wherein said first signal is provided within one-quarter of a spacecraft nutation period after said first error angle $\phi_1$ exceeds a threshold value.

* * * * *